Figure 1:
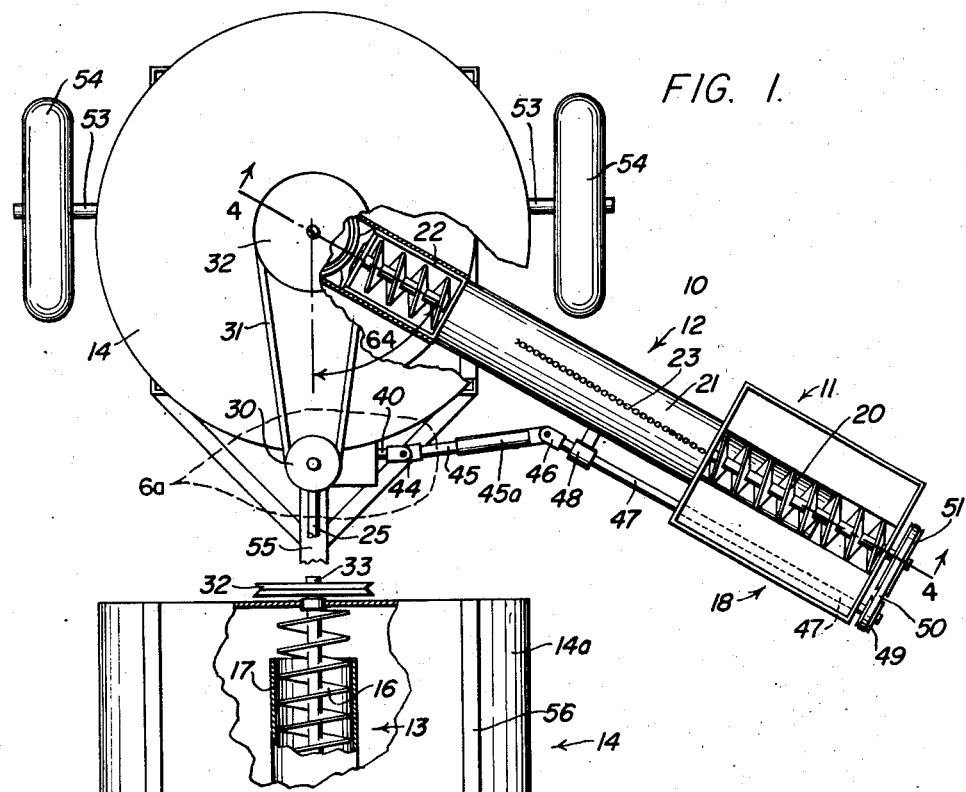

July 23, 1957  J. L. OLIVER  2,800,238
MOBILE FEED MIXER AND DISPENSER
Filed Nov. 15, 1954  2 Sheets-Sheet 1

Inventor:
JESSE L. OLIVER,
Attorneys

July 23, 1957

J. L. OLIVER 2,800,238

MOBILE FEED MIXER AND DISPENSER

Filed Nov. 15, 1954

2 Sheets-Sheet 2

Inventor:
JESSE L. OLIVER,
By
Attorneys.

United States Patent Office 2,800,238
Patented July 23, 1957

2,800,238

MOBILE FEED MIXER AND DISPENSER

Jesse L. Oliver, Delta, Utah

Application November 15, 1954, Serial No. 468,661

5 Claims. (Cl. 214—522)

This invention relates to feed mixers and dispensers, though not necessarily restricted thereto. More particularly it relates to a feed mixer and dispenser which is portable and is adapted for use in preparing balanced rations consisting ordinarily of grains and other ingredients for poultry or livestock feeding.

An important purpose is to provide a portable apparatus whereby the raw ingredients may be placed in the machine at a given point, such as in a farmyard, mixed, and then be dispensed at any desired remote feeding points. The mechanism is advantageously arranged so it can be transported from one point to another, for example, by means of a farm tractor. Thus, the finished mixture can be in readiness to be discharged intermittently for consumption by poultry or animals at the different points of feeding.

A feature of the mechanism is that no sacking or other cumbersome operation is necessary between the mixing operation and the dispensing of the mixture.

The apparatus of the invention advantageously includes a hopper for receiving the raw ingredients, followed by mixing and conveying means in several stages for transforming the raw ingredients into a finished feeding product. Just before the final stage is reached, the mixture is preferably passed through a screw elevator for delivery into a dispensing container.

The receiving hopper together with the mixing conveyor, which latter is preferably of the worm type, are so disposed that the ingredients are given a thorough primary mixing. After passing from the conveyor into the lower portion of the elevator, a secondary mixing occurs during the ascent of the mixing mass and the overflow thereof into the container. The result is a substantially uniform mass ready for feeding.

Intermittent removal of the mass for feeding is provided for by making it possible to lift the conveyor about its lower extremity and to reverse its motion. Now, by lifting the outer end of the conveyor, the contents of the container may be withdrawn and discharged at the desired feeding points.

The entire mechanism is adapted for mounting on an axle and two wheels, with provisions for readily attaching the vehicle to the drawbar of a tractor, so power is readily transmitted from the tractor power takeoff to the conveying and elevating members. The arrangement is such, that the feed hopper and its conveyor form an acute angle with the vehicle tongue, so that the conveyor may be raised or lowered without interfering with the traction wheels.

After the primary mixing, conveying means leads to and serves an elevator, which acts in the capacity of secondary mixing means. In the preferred construction, the elevator is located in a container in the form, for example, of a cylindrical bin or tank, the axis of the elevator being advantageously coincident with the vertical center line of the tank. Such an arrangement in general is not unknown. According to the invention, the primary mixing conveyor is arranged so its outboard end may be lowered at one time to the feeding level, while at another time, the mixing conveyor may be reversed in its conveying direction, so that the conveyor serves to discharge the finished mixture at any required dispensing level.

Another object of the invention is to provide simplicity and convenience in the mechanism for charging and discharging material, as well as to drive the customary elevator entirely from the outside of the container.

Figure 2:
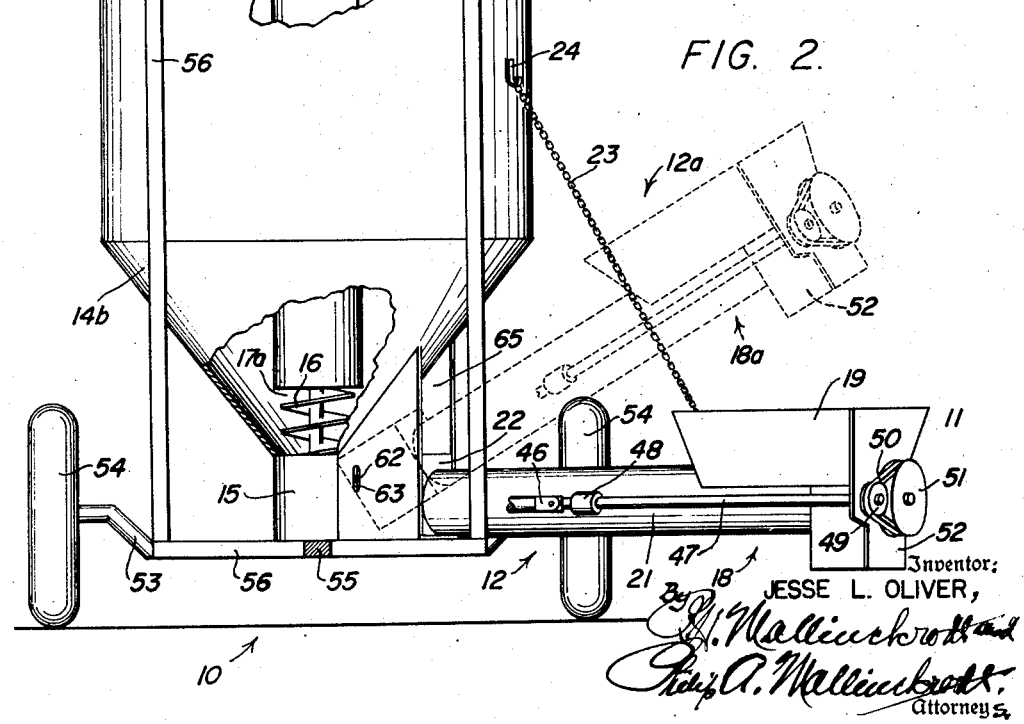
Figure 3:
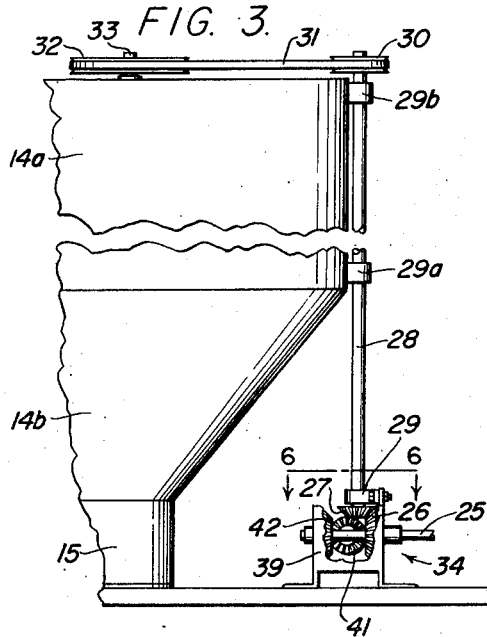
Figure 6:
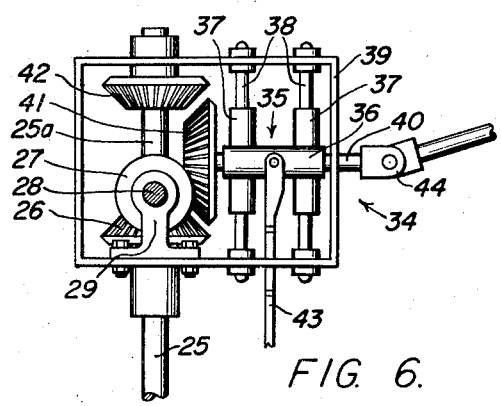
Figure 4:
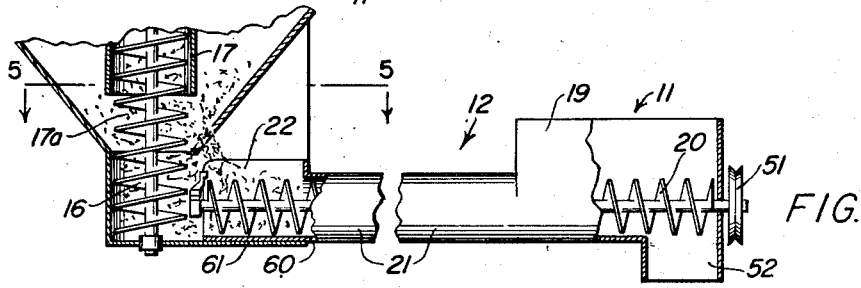
Figure 5:
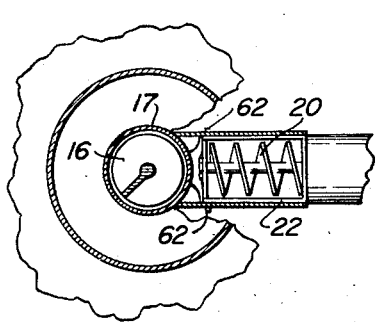
Figure 7:
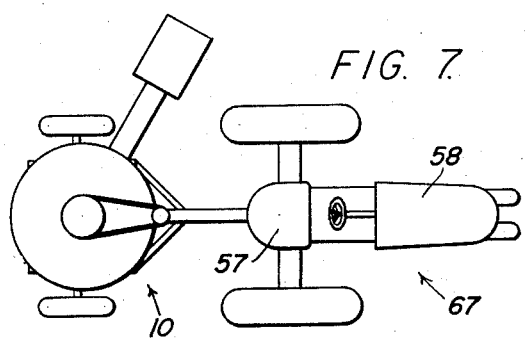

In the accompanying drawings, which illustrate an excellent embodiment of the invention, Fig. 1 represents a plan;

Fig. 2, a front elevation, portions being broken away to show interior arrangements;

Fig. 3, a fragmentary side elevation;

Fig. 4, a fragmentary vertical section taken on the line 4—4 in Fig. 1;

Fig. 5, a fragmentary horizontal section taken on the line 5—5 in Fig. 4;

Fig. 6, a horizontal section taken on the line 6—6 in Fig. 3, drawn to an enlarged scale, constituting a fragmentary plan located substantially within the encircling broken line 6a in Fig. 1; and Fig. 7, a line diagram indicating the position of the apparatus of the invention with respect to an ordinary tractor coupled to the front of the apparatus.

Referring to the drawings, the numeral 10 indicates the plant assembly ready for service. The plant assembly includes principally the feed hopper 11, the conveyor 12, the elevator 13, the storage container 14, Figs. 1, 2 and 3, and the power transmission mechanism 34, Figs. 3 and 6.

The container 14 may advantageously be in the form of a sheet metal tank having the upper cylindrical portion 14a and the lower inverted conical portion 14b, which latter terminates in a restricted cylindrical portion 15. The portion 15 encloses the lower extremity of a helical elevator screw 16, which works in a casing 17. The lower portion of the casing 17 has an opening 17a, the purpose of which will presently appear.

At 18 is a feeding and mixing assembly, comprising a hopper 19, a helical screw 20, and a casing 21. The inward end of the casing 21 terminates in a discharge box 22, the latter being disposed so as to permit the mixer 18 to be tilted upwardly from the substantially horizontal position in Fig. 2, to the raised, inclined position indicated in dotted lines at 18a. The mixer 18 is adapted for holding stationary in any desired position between 18 and 18a by any suitable means, for example, a chain 23, loosely and selectively engaged by a hook 24 fixed on the wall of the container 14.

Power for driving the screws 20 and 16 may be derived from the takeoff shaft of a tractor (not shown), such takeoff shaft being coupled (not shown) in any well known manner to the drive shaft 25 of the present mechanism. In the present instance, the shaft 25 at its inner end carries a fixed gear, such as a miter gear 26, Figs. 3 and 6, this gear being in mesh with a mating gear 27 fixed on the lower end of a substantially vertical shaft 28. The shaft 28 is rotatably disposed at 29, 29a and 29b, Fig. 3, and at its upper end has a fixed pulley 30. The pulley 30 is connected by a belt 31 to a pulley 32 fixed on the upper end of the elevator shaft 33.

The mixing conveyor 18, in this instance, derives its power from the drive shaft 25 by means of a shiftable transmission mechanism 34, Figs. 3 and 6. The mechanism 34 includes a carriage 35, a connecting bridge 36 and guide sleeves 37, on which the bridge 36 is fixed. The guide sleeves are slidable on guides 38, fixed in a housing 39. The bridge 36 may serve as a journal for a shaft 40, the inner end of which carries a gear 41, in this instance a miter gear, which may be selectively shifted into mesh with either the aforementioned gear 26 or with another mating gear 42. The gear 42 is fixed on an extension 25a of shaft 25, and functions to drive the gear 41 and the shaft 40 in the direction opposed to that existing when it, the gear 42, meshes in the gear 26.

Thus, when the gear 41 is moved from its neutral position, shown in Fig. 6, into mesh with the gear 26, the rotation of the shaft 25 imparts motion to the shaft 40 in a given direction, then moving the gear 41 into mesh with the gear 42 reverses the given direction. Shifting of the gear 41 is effected by means of a shifting rod 43 which extends to a point conveniently accessible to the operator. Motion from the shaft 40 is transmitted to the mixing screw 20, in this instance by means of a universal joint 44, an extensible shaft assembly 45 and 45a, a universal joint 46 and a jack shaft 47, the latter being journaled at 48. The jack shaft 47 carries a pulley 49, which is belted at 50 to a driven pulley 51 fixed on the shaft which drives the conveyor screw 20.

Assuming that rotation of the worm 20 is such as to convey the mixing material towards the storage container 14, then the traveling mixture will be delivered into the transfer box 22 and finally into the cylindrical portion 15 of the elevator 13. Here the traveling mixture is picked up by the screw 16 and is elevated through the casing 17 from which it overflows into the storage container. After filling the storage container, the apparatus is ready to be wheeled into a feeding lot or to some other destination where the contents are to be distributed intermittently at suitable points. For the purpose of transporting, and for dispensing, the mixing conveyor 12 is lifted into an elevated position such as that indicated in dotted lines at 12a to a suitable height for discharging the mixed feed through the spout 52.

It is to be noted that when the conveyor 12 is in the raised position 12a, that the distance between the universal joints 44 and 46 varies considerably from the distance between these universal joints when the conveyor 12 is in its normal level position, as indicated in full lines in the lower right hand portion of Fig. 2. In order to compensate for the variable distances between universal couplings 44 and 46, the portion 45a of the extensible shaft assembly may be a tubular sleeve into which the shaft 45 telescopes.

To prevent the shaft 45 from turning within the sleeves 45a, any suitable construction may be employed, such as making the shaft 45 square in cross section and the tubular member 45 correspondingly square in cross section so that the two may be slidably assembled for lengthening or shortening the distance between the universals 44 and 46.

The mixed feed is discharged when motion is imparted to the delivery mechanism from the shaft 25 by means of the shifting lever 43. This is effective to rotate the screw 20 in opposition to its normal feeding rotation, thereby drawing feeding material from the transfer box 22, the contents of which are being constantly replenished from the storage container 14 by gravity or otherwise.

In the present instance the container 14 together with its appurtenant mechanism is mounted in a frame 56. The entire structure may be supported on a depressed axle 53, which is journaled in the respective traction wheels 54. A drawbar 55 is suitably fixed in the vehicle structure and is arranged for connecting to any suitable coupling means constituting usual equipment on a farm tractor.

In Fig. 1, it is to be noted that the conveyor 12 with its hopper 11, makes an acute angle 64, horizontally in relation to the center line of draft of the tractor and the travel of the mixer. This enables the driver, from the seat 57 of the tractor 58, to gain a convenient view of the performance of the conveyor when used as a discharge elevator, as indicated in dotted lines in Fig. 1. This makes the placement of the dispensing material in discharging from the elevated conveyor easy to regulate with a high degree of accuracy, relatively to the points of feeding, whether discharge takes place directly onto the ground or into a particular line of feeding troughs. In using the apparatus in this manner, the conveyor is brought to a suitably raised position where all the driver needs to do to control the performance of the elevating conveyor is to manipulate the shifting rod 43. The angular arrangement of the conveyor and its hopper is also a convenience when the conveyor is used to charge the mixing feed into the elevator which serves the storage container.

A feature that may be stressed, is that the conical lower portion of the storage container communicates directly with the compartment 59. By this means, what is normally the discharge end of the conveyor 12, actually becomes its intake end, while its normal intake end at the hopper 11, actually becomes temporarily, the discharge end at the spout 52. This feature is clear in Fig. 2 where it will be noted that the change of the conveyor 12, from the charging capacity, to the discharging capacity or vice versa, is quickly achieved by reversing the direction of the rotation of the conveyor screw 16. This double functioning of the conveyor 12 is facilitated by the fact that the lower edge 60 acts as a rocker on the floor portion 61. A bolt 62, which is engaged in a slot 63 holds the rocking portion nominally in position and allows its lower edge to scrape slightly along the floor 61, from one position to another.

In Fig. 1, the axle 53, in addition to the depression in the vertical plane, is curved backwardly in the horizontal plane to form an area corresponding to the discharge box 22, thereby providing an opening 65 having a removable cover 66. If and when desired, the cover can be removed and the contents of the container dropped directly underneath the opening 65.

In Fig. 7, the normal relation between the present assembly 10 and any usual tractor 67 is illustrated.

While the foregoing description is more or less specific, it is to be understood that various changes may be made therein without departing from the scope of the invention which is defined in the following claims.

I claim:

1. A feed mixer comprising a container for feed material, said container having an internally disposed, substantially vertical, screw elevator; driving mechanism for the elevator screw, said driving mechanism being external to the conveyor and including a drive pulley mounted on the elevator screw so as to rotate in a plane substantially parallel to the top of the container; a jack shaft disposed substantially vertically along the outside wall of the container, said jack shaft extending above the container and having a pulley belted to the first-mentioned pulley; and means for imparting motion to the jack shaft at the lower end thereof.

2. A feed mixer and dispenser comprising storage means for prepared feed material and an elevator having a lower portion within said storage means; a service conveyor in communication with the lower portion of said elevator, the said service conveyor being selectively tiltable for feeding material into said elevator from a lowered position and alternatively to withdraw material from the storage container from the proximity of the said lower portion; and a driving mechanism operative to impart motion simultaneously to both the elevator mechanism and to the service conveyor along the outside of said storage means.

3. A feed mixer and dispenser comprising a container for feed material; a service conveyor extending into the lower portion of said container, said service conveyor being tiltable from a lower charging position to an upper discharging position; a driving mechanism for said service conveyor, said driving mechanism including a drive shaft having two spaced-apart, mutually opposed gears fixed thereon; a power take-off shaft; a gear fixed on the power take-off shaft so as to selectively mesh with one of the said opposing gears at one time, and to mesh with the other of the opposing gears at another time; means for shifting the movable gear from one meshing position to the other; a jack shaft adjacent the said conveyor; and an extensible shaft means connecting the take-off shaft means to the said jack shaft.

4. A feed mixer and dispenser according to claim 2, wherein the said take-off shaft means includes a carriage; two parallel guide sleeves; a bridge connecting the guide sleeves; guides on which the guide sleeves are slidably mounted; and shaft means extending from the said take-off shaft to the said service conveyor shaft.

5. A feed mixer and dispenser having a storage container; charging means for delivering material into the container in a given direction; reversing means disposed to cause the conveyor to have its operation reversed so as to withdraw feed material from the storage container; and means for elevating the conveyor into its discharging position.

References Cited in the file of this patent

UNITED STATES PATENTS

| | | |
|---|---|---|
| 2,057,403 | Vali et al. | Oct. 13, 1936 |
| 2,101,490 | Bullock et al. | Dec. 7, 1937 |
| 2,470,836 | Piper | May 24, 1949 |
| 2,479,899 | Beyer | Aug. 23, 1949 |
| 2,517,456 | Wherrett | Aug. 1, 1950 |
| 2,585,414 | Steffens | Feb. 12, 1952 |
| 2,648,461 | Stephenson | Aug. 11, 1953 |
| 2,675,932 | Potter | Apr. 20, 1954 |
| 2,676,721 | Hansen | Apr. 27, 1954 |